United States Patent
Valentin et al.

(10) Patent No.: US 12,182,922 B2
(45) Date of Patent: Dec. 31, 2024

(54) COMPUTING IMAGES OF CONTROLLABLE DYNAMIC SCENES

(71) Applicant: Microsoft Technology Licensing, LLC, Redmond, WA (US)

(72) Inventors: Julien Pascal Christophe Valentin, Zurich (CH); Virginia Estellers Casas, Cambridge (GB); Shideh Rezaeifar, Basel (CH); Jingjing Shen, Cambridge (GB); Stanislaw Kacper Szymanowicz, Cambridge (GB); Stephan Joachim Garbin, London (GB); Marek Adam Kowalski, Komorow (PL); Matthew Alastair Johnson, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 94 days.

(21) Appl. No.: 17/933,453

(22) Filed: Sep. 19, 2022

(65) Prior Publication Data
US 2024/0037829 A1    Feb. 1, 2024

(30) Foreign Application Priority Data
Jul. 26, 2022    (GB) .................................... 2210930

(51) Int. Cl.
*G06T 15/00*    (2011.01)
*G06T 13/40*    (2011.01)
(Continued)

(52) U.S. Cl.
CPC .............. *G06T 13/40* (2013.01); *G06T 15/06* (2013.01); *G06T 15/08* (2013.01); *G06T 15/20* (2013.01); *G06T 17/20* (2013.01)

(58) Field of Classification Search
CPC ......... G06T 19/00; G06T 17/20; G06T 17/00; G06T 15/10; G06T 15/00; G06T 13/40;
(Continued)

(56) References Cited

U.S. PATENT DOCUMENTS

| 2011/0149340 A1* | 6/2011 | Lipman | G06T 19/20 358/1.15 |
| 2017/0018121 A1* | 1/2017 | Lawson | G06V 40/10 |

(Continued)

OTHER PUBLICATIONS

"International Search Report and Written Opinion Issued in PCT Application No. PCT/US23/025095", Mailed Date: Oct. 27, 2023, 22 Pages.

(Continued)

*Primary Examiner* — Gordon G Liu
(74) *Attorney, Agent, or Firm* — Barta Jones, PLLC

(57) ABSTRACT

To compute an image of a dynamic 3D scene comprising a 3D object, a description of a deformation of the 3D object is received, the description comprising a cage of primitive 3D elements and associated animation data from a physics engine or an articulated object model. For a pixel of the image the method computes a ray from a virtual camera through the pixel into the cage animated according to the animation data and computes a plurality of samples on the ray. Each sample is a 3D position and view direction in one of the 3D elements. The method computes a transformation of the samples into a canonical cage. For each transformed sample, the method queries a learnt radiance field parameterization of the 3D scene to obtain a color value and an opacity value. A volume rendering method is applied to the color and opacity values producing a pixel value of the image.

20 Claims, 9 Drawing Sheets

(51) Int. Cl.

| | |
|---|---|
| G06T 15/06 | (2011.01) |
| G06T 15/08 | (2011.01) |
| G06T 15/20 | (2011.01) |
| G06T 17/20 | (2006.01) |

(58) Field of Classification Search
CPC ......... G06T 15/06; G06T 15/08; G06T 15/20; G06T 19/006; G06T 7/337; G06T 7/50; G06T 7/74; G06T 19/20; G06T 2200/04; G06T 2207/10016; G06T 2207/30244; G06T 2219/024; G06T 2219/2016; G06V 20/20
USPC .......................................................... 345/419
See application file for complete search history.

(56) References Cited

U.S. PATENT DOCUMENTS

| | | | | |
|---|---|---|---|---|
| 2018/0085201 | A1* | 3/2018 | Wu | G16H 70/60 |
| 2022/0239844 | A1* | 7/2022 | Lv | G06T 15/205 |
| 2023/0140460 | A1* | 5/2023 | Munkberg | G06N 3/045 |
| | | | | 345/423 |

OTHER PUBLICATIONS

Barron, et al., "Mip-NeRF: A Multiscale Representation for Anti-Aliasing Neural Radiance Fields", In Proceedings of the IEEE/CVF International Conference on Computer Vision, Oct. 11, 2021, pp. 5855-5864.
Cao, et al., "Authentic volumetric avatars from a phone scan", In ACM Transactions on Graphics, vol. 41, Issue 4, Jul. 2022, 19 Pages.
Gafni, et al., "Dynamic Neural Radiance Fields for Monocular 4D Facial Avatar Reconstruction", In Proceedings of the IEEE/CVF Conference on Computer Vision and Pattern Recognition, Jun. 2021, pp. 8649-8658.
Gao, et al., "Learning Deformable Tetrahedral Meshes for 3D Reconstruction", In Repository of arXiv:2011.01437v1, Nov. 3, 2020, 12 Pages.
Garbin, et al., "FastNeRF: High-Fidelity Neural Rendering at 200FPS.", In Repository of arXiv:2103.10380v1, Mar. 18, 2021, 10 Pages.
Gascon, et al., "Fast Deformation of Volume Data Using Tetrahedral Mesh Rasterization", In Proceedings of the 12th ACM SIGGRAPH/Eurographics Symposium on Computer Animation, Jul. 19, 2013, 5 Pages.
Gehring, et al., "Convolutional Sequence to Sequence Learning", In Repository of arXiv:1705.03122v3, Jul. 25, 2017, 15 Pages.
Grassal, et al., "Neural head avatars from monocular RGB videos", In Proceedings of the IEEE/CVF Conference on Computer Vision and Pattern Recognition, Jun. 19, 2022, pp. 18653-18664.
Hedman, et al., "Baking Neural Radiance Fields for Real-Time View Synthesis", In Repository of arXiv:2103.14645v1, Mar. 26, 2021, 15 Pages.
Hedman, et al., "Baking Neural Radiance Fields for Real-Time View Synthesis", In Proceedings of the IEEE/CVF International Conference on Computer Vision, Oct. 11, 2021, pp. 5875-5884.
Ju, et al., "Mean value coordinates for closed triangular meshes", In ACM Siggraph 2005 Papers, Jul. 1, 2005, pp. 561-566.
Kajiya, et al., "Ray tracing volume densities", In Journal of ACM SIGGRAPH computer graphics, Jul. 1984, pp. 165-174.
Liu, et al., "Neural Actor: Neural Free-view Synthesis of Human Actors with Pose Control", In Journal of ACM Transactions on Graphics vol. 40, No. 6, Dec. 2021, 16 Pages.
Liu, et al., "Neural Sparse Voxel Fields", In Annual Conference on Neural Information Processing Systems, Dec. 6, 2020, 13 Pages.
Lombardi, et al., "Mixture of volumetric primitives for efficient neural rendering", In ACM Transactions on Graphics (TOG), vol. 40, Issue 4, Aug. 2021, 13 Pages.
Lombardi, et al., "Neural Volumes: Learning Dynamic Renderable vols. from Images.", In Repository of arXiv:1906.07751v1, Jun. 18, 2019, 14 Pages.
Loper, et al., "SMPL: A Skinned Multi-Person Linear Model", In Proceedings of ACM SIGGRAPH, vol. 34, Issue 6, Nov. 4, 2015, 16 Pages.
Lorensen, et al., "Marching cubes: A high resolution 3D surface construction algorithm", In Proceedings of the ACM SIGGRAPH Computer Graphics, vol. 21, Issue 4, Jul. 1987, pp. 163-169.
Mildenhall, et al., "NeRF: Representing Scenes as Neural Radiance Fields for View Synthesis", In Repository of arXiv:2003.08934v2, Aug. 3, 2020, pp. 1-25.
Müller, et al., "Instant Neural Graphics Primitives with a Multiresolution Hash Encoding", In Repository of arXiv:2201.05989v1, Jan. 16, 2022, 13 Pages.
Müller, et al., "Neural importance sampling", In Journal of ACM Transactions on Graphics (TOG), vol. 38, Issue 5, Oct. 10, 2019, 19 Pages.
Munkberg, et al., "Extracting Triangular 3D Models, Materials, and Lighting From Images", In Repository of arXiv:2111.12503v1, Nov. 24, 2021, pp. 1-20.
Nagano, et al., "paGAN: Real-time avatars using dynamic textures", In Journal of ACM Transactions on Graphics, vol. 37, No. 6, Article 258., Nov. 2018, 13 Pages.
Park, et al., "HyperNeRF: A Higher-Dimensional Representation for Topologically Varying Neural Radiance Fields", In Journal of ACM Transactions Graph, vol. 40, Issue 6, Dec. 2021, 7 Pages.
Park, et al., "Nerfies: Deformable Neural Radiance Fields", In Proceedings of the IEEE/CVF International Conference on Computer Vision, Oct. 11, 2021, pp. 5865-5874.
Parker, et al., "OptiX: A General Purpose Ray Tracing Engine", In ACM Transactions on Graphics, vol. 29, Issue 4, Jul. 26, 2010, 14 Pages.
Peng, et al., "Neural Body: Implicit Neural Representations with Structured Latent Codes for Novel View Synthesis of Dynamic Humans", In Repository of arXiv:2012.15838v1, Dec. 31, 2020, 10 Pages.
Pumarola, et al., "D-NeRF: Neural Radiance Fields for Dynamic Scenes", In Proceedings of the IEEE/CVF Conference on Computer Vision and Pattern Recognition, Jun. 19, 2021, pp. 10318-10327.
Shen, et al., "Deep Marching Tetrahedra: a Hybrid Representation for High-Resolution 3D Shape Synthesis", In Journal of Advances in Neural Information Processing Systems, Dec. 6, 2021, 15 Pages.
Sifakis, et al., "FEM Simulation of 3D Deformable Solids: A practitioner's guide to theory, discretization and model reduction", In SIGGRAPH '12: ACM SIGGRAPH 2012 Courses, Aug. 2012, 50 Pages.
Sun, et al., "Direct Voxel Grid Optimization: Super-fast Convergence for Radiance Fields Reconstruction", In Repository of arXiv:2111.11215v1, Nov. 22, 2021, 25 Pages.
Tancik, et al., "Fourier Features Let Networks Learn High Frequency Functions in Low Dimensional Domains", In Repository of arXiv:2006.10739v1, Jun. 18, 2020, 24 Pages.
Vaswani, et al., "Attention Is All You Need", In Repository of arXiv:1706.03762v5, Dec. 6, 2017, 15 Pages.
Wald, et al., "RTX Beyond Ray Tracing: Exploring the Use of Hardware Ray Tracing Cores for Tet-Mesh Point Location.", In in High-Performance: Graphics—Short Papers, Jul. 8, 2019, 7 Pages.
Wang, et al., "MoRF: Morphable Radiance Fields for Multiview Neural Head Modeling", In ACM SIGGRAPH 2022 Conference Proceedings, Jul. 2022, 9 Pages.
Wood, et al., "3D Face Reconstruction with Dense Landmarks", In Repository of arXiv:2204.02776v2, Jul. 20, 2022, 24 Pages.
Wood, et al., "Fake it till you make it: face analysis in the wild using synthetic data alone", In Repository of arXiv:2109.15102v2, Oct. 5, 2021, 11 Pages.
Yifan, et al., "Neural Cages for Detail-Preserving 3D Deformations", In Proceedings of the IEEE/CVF Conference on Computer Vision and Pattern Recognition, Jun. 14, 2020, pp. 75-83.
Yu, et al., "Plenoctrees for real-time rendering of neural radiance fields", In Proceedings of the IEEE/CVF International Conference on Computer Vision 2021, Oct. 11, 2021, pp. 5752-5761.

(56) References Cited

OTHER PUBLICATIONS

Yu, et al., "Plenoxels: Radiance Fields without Neural Networks", In Repository of arXiv:2112.05131v1, Dec. 9, 2021, 21 Pages.
Yuan, et al., "NeRF-Editing: Geometry Editing of Neural Radiance Fields", In Proceedings of the IEEE/CVF Conference on Computer Vision and Pattern Recognition, Jun. 19, 2022, pp. 18353-18364.
Dinev, et al., "Solving for Muscle Blending using Data", In Journal of Computers & Graphics, vol. 92, Nov. 1, 2020, 12 Pages.
"Invitation to Pay Additional Fees Issued in PCT Application No. PCT/US23/025095", Mailed Date: Sep. 6, 2023, 17 Pages.
Xian, et al., "Automatic Generation of Coarse Bounding Cages from Dense Meshes", In Proceedings of IEEE International Conference on Shape Modeling and Applications, Jun. 28, 2009, pp. 21-27.
Xu, et al., "Deforming Radiance Fields with Cages", In Repository of arXiv:2207.12298v1, Jul. 25, 2022, 17 Pages.

\* cited by examiner

302

300

COMPUTING IMAGES OF CONTROLLABLE DYNAMIC SCENES

CROSS-REFERENCE TO RELATED APPLICATION(S)

This non-provisional utility application claims priority to UK patent application number 2210930.0 entitled "COMPUTING IMAGES OF CONTROLLABLE DYNAMIC SCENES" and filed on Jul. 26, 2022, which is incorporated herein in its entirety by reference.

BACKGROUND

A dynamic scene is an environment in which one or more objects are moving; in contrast to a static scene where all objects are stationary. An example of a dynamic scene is a person's face which moves as the person talks. Another example of a dynamic scene is a propellor of an aircraft which is rotating. Another example of a dynamic scene is a standing person with moving arms.

In traditional computer graphics, computing synthetic images of dynamic scenes is a complex task since a rigged three dimensional (3D) model of the scene and its dynamics is needed. Obtaining such a rigged 3D model is complex and time consuming and involves manual work.

Synthetic images of dynamic scenes are used for a variety of purposes such as computer games, films, video communications and more.

The embodiments described below are not limited to implementations which solve any or all of the disadvantages of known apparatus for computing synthetic images of dynamic scenes.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a way of computing images of dynamic scenes in a controllable way, so that a user or an automated process is able to easily control how the dynamic scene animates. Optionally, the images are computed in real time (such as at 30 frames per second or more) and are photorealistic, that is the images have characteristics generally matching those of empirical images and/or video.

In various examples there is a computer-implemented method of computing an image of a dynamic 3D scene comprising a 3D object. The method comprises receive a description of a deformation of the 3D object, the description comprising a cage of primitive 3D elements and associated animation data from a physics engine or an articulated object model. For a pixel of the image the method computes a ray from a virtual camera through the pixel into the cage animated according to the animation data and computes a plurality of samples on the ray. Each sample is a 3D position and view direction in one of the 3D elements. The method computes a transformation of the samples into a canonical version of the cage to produce transformed samples. For each transformed sample, the method queries a learnt radiance field parameterization of the 3D scene to obtain a color value and an opacity value. A volume rendering method is applied to the color and opacity values to produce a pixel value of the image.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
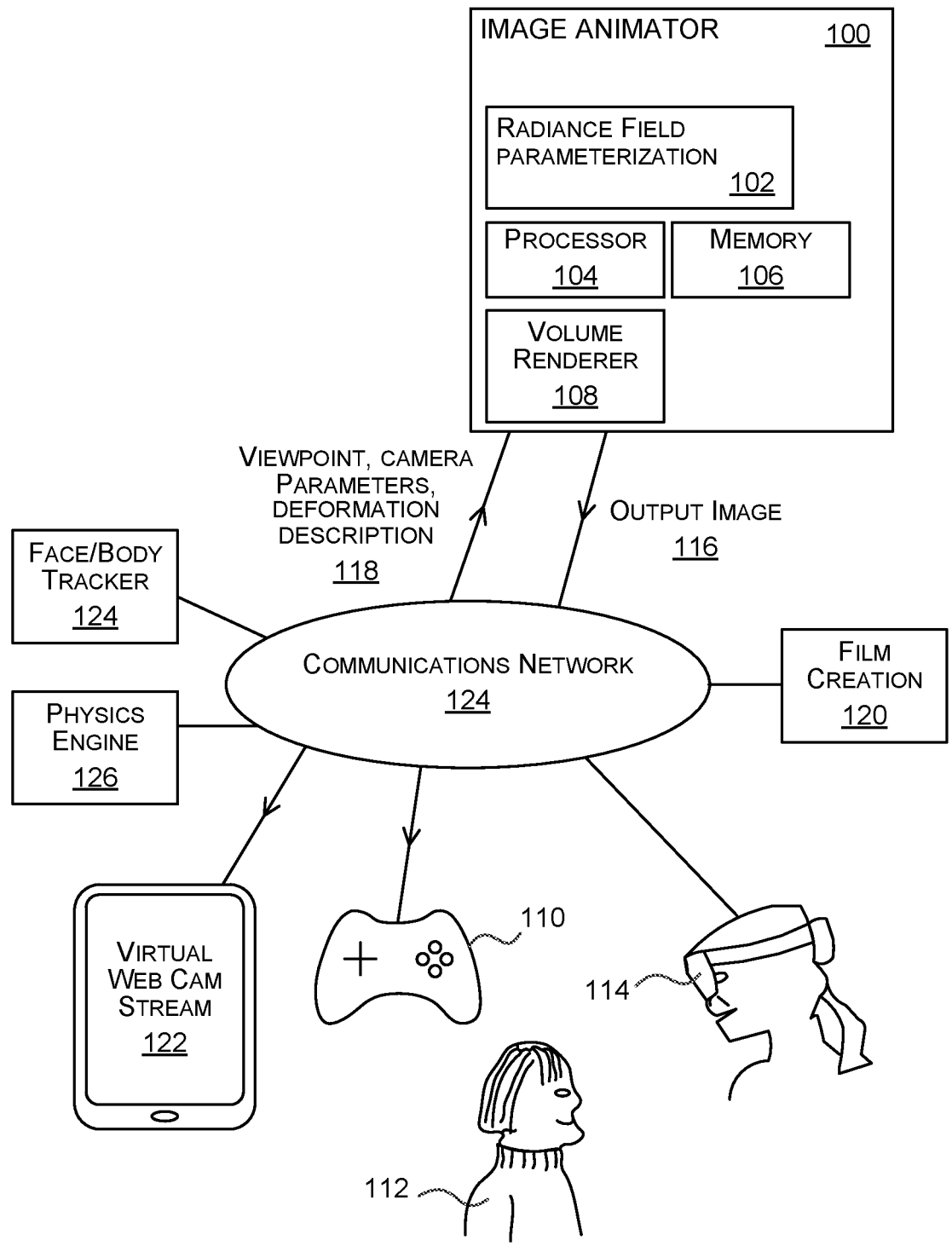
FIG. 1 is a schematic diagram of an image animator for computing images of controllable dynamic scenes.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

The technology described herein uses radiance fields and volume rendering methods. Radiance field parameterizations represent a radiance field which is a function from five dimensional (5D) space to four dimensional (4D) space (referred to as a field) where values of radiance are known for each pair of 3D point and 2D view direction in the field. A radiance value is made up of a color value and an opacity value. A radiance field parameterizations may be a trained machine learning model such as a neural network, support vector machine, random decision forest or other machine learning model which learns an association between radiance values and pair of 3D points and view directions. In some cases, a radiance field parametrization is a cache of associations between radiance values and 3D points, where the associations are obtained from a trained machine learning model.

Volume rendering methods compute an image from a radiance field for a particular camera viewpoint by examining radiance values of points along rays which form the image. Volume rendering software is well known and commercially available.

As mentioned above, synthetic images of dynamic scenes are used for a variety of purposes such as computer games, films, video communications, telepresence and others. However, it is difficult to generate synthetic images of dynamic scenes in a controllable way; that is, to be able to easily and precisely control how the scene animates. Precise control is desired for many applications such as where synthetic images of an avatar of a person in a video call are to accurately depict the facial expression of the real person. Precise control is also desired for video game applications where an image of a particular chair is to be made to shatter in a realistic manner. These examples of the video call and video game are not intended to be limiting but rather to illustrate uses of the present technology. The technology can be used to capture any scene which is static or dynamic such as objects, vegetation environments, humans or other scenes.

Enrollment is another problem that arises when generating synthetic images of dynamic scenes. Enrollment is where a radiance field parameterization is created for a particular 3D scene, such as a particular person or a particular chair. Some approaches to enrollment use large quantities of training images depicting the particular 3D scene over time and from different viewpoints. Where enrollment is time consuming and computationally burdensome difficulties arise.

Being able to generate synthetic images of dynamic scenes in real time, such as during a video call where an avatar of a caller is to be created, is increasingly important. However, due to the complex computation and computational burden, it is difficult to achieve real time operation.

Generalization ability is an ongoing issue. It is often difficult for trained radiance field parameterizations to be able to generalize so as to facilitate computing images of a 3D scene which differ from those images used during training of the radiance field parameterization.

Alternative approaches using implicit deformation methods based on learned functions are 'black boxes' to content creators, they require large amounts of training data to generalize meaningfully, and they do not produce realistic extrapolations outside the training data.

The present technology provides a precise way to control how images of dynamic scenes animate. A user, or an automated process, is able to specify parameter values such as volumetric blendshapes and skeleton values which are applied to a cage of primitive 3D elements. In this way the user or automated process is able to precisely control deformation of a 3D object to be depicted in a synthetic image. In other examples, a user of an automated process is able to use animation data from a physics engine to precisely control deformation of the 3D object to be depicted in the synthetic image. A blendshape is a mathematical function which when applied to a parameterized 3D model changes parameter values of the 3D model. In an example, where the 3D model is of a person's head there may be several hundred blendshapes, each blendshape changing the 3D model according to a facial expression or an identity characteristic.

The present technology reduces the burden of enrollment in some examples. Enrollment burden is reduced by using a reduced amount of training images, such as training image frames from only one or only two time instants.

The present technology is able to operate in real time (such as at 30 frames per second or more) in some examples. This is achieved by using optimizations when computing a transform of sample points to a canonical space used by the radiance field parameterization.

The present technology operates with good generalization ability in some cases. By creating a scene animatable with parameters from a chosen face model or physics engines the technology can use the model dynamics from the face model or physics engine to animate the scene beyond the training data in a physically meaningful way to generalize well.

FIG. 1 is a schematic diagram of an image animator 100 for computing synthetic images of dynamic scenes. In some cases the image animator 100 is deployed as a web service. In some cases the image animator 100 is deployed at a personal computer or other computing device which is in communication with a head worn computer 114 such as a head mounted display device. In some cases the image animator 100 is deployed in a companion computing device of head worn computer 114.

The image animator 100 comprises a radiance field parametrization 102, at least one processor 104, a memory 106 and a volume renderer 108. In some cases the radiance field parametrization 102 is a neural network, or a random decision forest, or a support vector machine or other type of machine learning model. It has been trained to predict pairs of color and opacity values of three dimensional points and view directions in a canonical space of a dynamic scene and more detail about the training process is given later in this document. In some cases the radiance field parametrization 102 is a cache storing associations between three dimensional points in the canonical space and color and opacity values.

The volume renderer 108 is a well-known computer graphics volume renderer which takes pairs of color and opacity values of three dimensional points along rays and computes an output image 116.

The image animator 100 is configured to receive queries from client devices such as smart phone 122, computer game apparatus 110, head worn computer 114, film creation apparatus 120 or other client device. The queries are sent from the client devices over a communications network 124 to the image animator 100.

A query from a client device comprises a specified viewpoint of a virtual camera, specified values of intrinsic parameters of the virtual camera and a deformation description 118. A synthetic image is to be computed by the image animator 100 as if it had been captured by the virtual camera. The deformation description describes desired dynamic content of the scene in the output image 116.

The image animator 100 receives a query and in response generates a synthetic output image 116 which it sends to the client device. The client device uses the output image 116 for one of a variety of useful purposes including but not limited to: generating a virtual webcam stream, generating video of a computer video game, generating a hologram for display by a mixed-reality head worn computing device, generating a film. The image animator 100 is able to compute synthetic images of a dynamic 3D scene, for particular specified desired dynamic content and particular specified viewpoints, on demand. In an example, the dynamic scene is a face of a talking person. The image animator 100 is able to compute synthetic images of the face from a plurality of viewpoints and with any specified dynamic content. Non-limiting examples of specified viewpoints and dynamic content are: plan view, eyes shut, face tilted upwards, smile; perspective view, eyes open, mouth open, angry expression. Note that the image animator 100 is able to compute synthetic images for viewpoints and deformation descriptions which were not present in training data used to train the radiance field parameterization 102 since the machine learning used to create the radiance field parameterization 102 is able to generalize. Other examples of dynamic scenes are given with reference to FIG. 2 and FIG. 3 below and include generic objects such as chairs, cars, trees, full human bodies. By using the deformation description it is possible to control the dynamic scene content depicted in the generated synthetic image. The deformation description is obtained using a physics engine 126 in some cases so that a user or an automated process is able to apply physics rules to shatter a 3D object depicted in the synthetic output image 116 or to apply other physics rules to depict animations such as bouncing, waving, rocking, dancing, rotating, spinning or other animations. It is possible to use a Finite Element Method to apply physical simulations to a cage of 3D primitive elements to create the deformation description such as to produce elastic deformation or shattering. The deformation description is obtained using a face or body tracker 124 in some cases such as where an avatar of a person is being created. By selecting the viewpoint and the intrinsic camera parameter values it is possible to control characteristics of the synthetic output image.

The image animator operates in an unconventional manner to enable synthetic images of dynamic scenes to be generated in a controllable manner. Many alternative methods of using machine learning to generate synthetic images have little or no ability to control content depicted in the synthetic images which are generated.

The image animator 100 improves the functioning of the underlying computing device by enabling synthetic images of dynamic scenes to be computed in a manner whereby the content and viewpoint of the dynamic scene is controllable.

Alternatively, or in addition, the functionality of the image animator 100 is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

In other examples the functionality of the image animator 100 is located at a client device, or is shared between a client device and the cloud.

Figure 2:
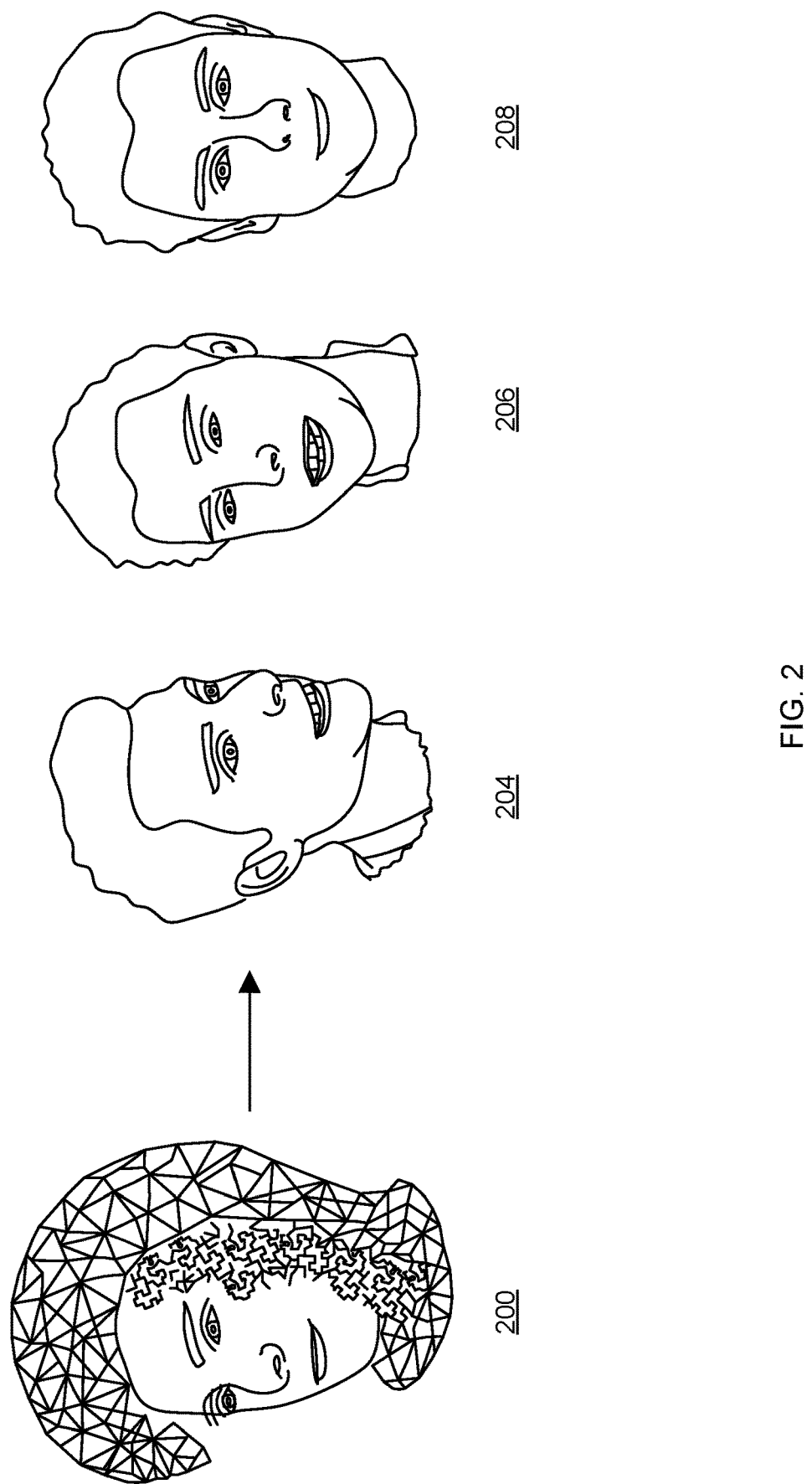
FIG. 2 shows a deformation description and three images of the person's head computed using the image animator of FIG. 1.

FIG. 2 shows a deformation description 200 and three images 204, 206, 208 of a person's head computed using the image animator 100 of FIG. 1, each image showing the person's head animated in a different way such as with the mouth open or closed. The deformation description 200 is a cage of primitive 3D elements which in the example of FIG. 2 are tetrahedra although other primitive 3D elements are used in some examples such as spheres or cuboids. In the example of FIG. 2 the cage of tetrahedra extends from a surface mesh of the person's head so as to include a volume around the head which is useful to represent hair of the person and any headgear worn by the person. In the case of generic objects such as chairs the volume around the object in the cage is useful because modelling the volume with volume rendering methods results in more photorealistic images and the cage only needs to approximate the mesh; this reduces the complexity of the cage for objects with many parts (the cage for a plant does not need to have a different part of each leave, it just needs to cover all foliage) and allows to use the same cage for objects of the same type that have a similar shape (different chairs can use the same cage). The cage can be intuitively deformed and controlled by users, physics-based simulation, or traditional automated animation techniques like blendshapes. Human faces are a particularly difficult case due to a non-trivial combination of rigid and (visco)elastic motion and yet the present technology performs well for human faces as described in more detail below. Once a radiance field is trained using the present technology, it is possible to generalize to any geometric deformation that can be expressed with the cage of 3D primitives constructed from its density. This opens new possibilities to use volumetric models in games or augmented reality/virtual reality contexts where a user's manipulation of the environment is not known a priori.

In an example the deformation description 200 is referred to as a volumetric three dimensional morphable model (Vol3DMM) which is a parametric 3D face model which animates a surface mesh of a person's head and the volume around the mesh using a skeleton and blendshapes.

A user or an automated process is able to specify values of parameters of the Vol3DMM model which are used to animate the Vol3DMM model in order to create the images 204 to 208 as described in more detail below. Different values of the parameters of the Vol3DMM model are used to produce each of the three images 204 to 208. The Vol3DMM model together with parameter values is an example of a deformation description.

Vol3DMM animates a volumetric mesh with a sequence of volumetric blendshapes and a skeleton. It is a generalization of parametric three dimensional morphable models (3DMM) models, which animate a mesh with a skeleton and blendshapes, to a parametric model to animate a volume around a mesh.

Define the skeleton and blendshapes of Vol3DMM by extending the skeleton and blendshapes of a parametric 3DMM face model. The skeleton has four bones: a root bone controlling rotation, a neck bone, a left eye bone, and a right eye bone. To use this skeleton in Vol3DMM, extend linear blend skinning weights from the vertices of the 3DMM mesh to the vertices of tetrahedra by a nearest-vertex look up, that is, each tetrahedron vertex has the skinning weights of the closest vertex in the 3DMM mesh. The volumetric blendshapes are created by extending the 224 expression blendshapes and the 256 identity blendshapes of the 3DMM model to the volume surrounding its template mesh: the i-th volumetric blend-shape of Vol3DMM is created as a tetrahedral embedding of the mesh of the i-th 3DMM blendshape. To create the tetrahedral embedding, create a single volumetric structure from a generic mesh and create an accurate embedding that accounts for face geometry and face deformations: it avoids tetrahedral inter-penetrations between upper and lower lips, it defines a volumetric support that covers hair, and has higher resolution in areas subject to more deformation. In an example, the exact number of bones or blendshapes is inherited from the specific instance of 3DMM model chosen, but the technique can be applied to different 3DMM models using blendshapes and or skeletons to model faces, bodies, or other objects.

As a result of this construction, Vol3DMM is controlled and posed with the same identity, expression, and pose parameters $\alpha$, $\beta$, $\theta$ of a 3DMM face model. This means that it is possible to animate it with a face tracker built on the 3DMM face model by changing $\alpha$, $\beta$, $\theta$ and, more importantly, that it generalizes to any expression representable by the 3DMM face model as long as there is a good fit of the face model to the training frame. During training use the parameters $\alpha$, $\beta$, $\theta$ to pose the tetrahedral mesh of Vol3DMM to define the physical space, while a canonical space is defined for each subject by posing Vol3DMM with identity parameter α and setting β, θ to zero for a neutral pose. In an example, the decomposition into identity, expression, and pose is inherited from the specific instance of 3DMM model chosen. However, the technology to train and/or animate adapts to different decompositions by constructing a corresponding Vol3DMM model for the specific 3DMM model chosen.

Figure 3:
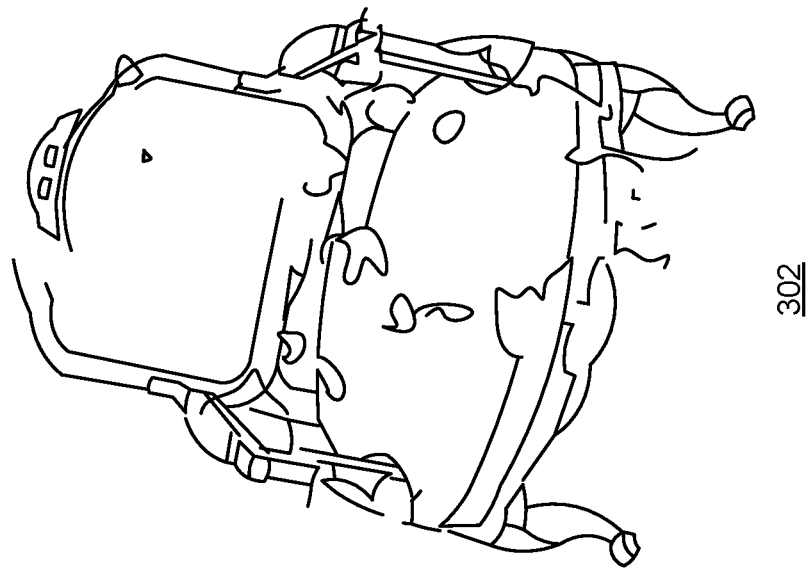
FIG. 3 shows a chair and an image of the chair shattering computed using the image animator of FIG. 1.
Figure 3:
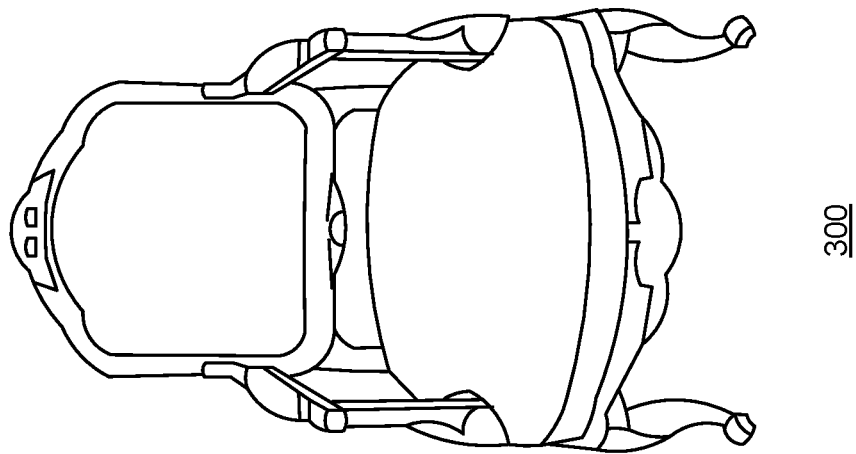

FIG. 3 shows a chair 300 and a synthetic image 302 of the chair shattering computed using the image animator of FIG. 1. In this case the deformation description comprises a cage around the chair 300 where the cage is formed of primitive 3D elements such as tetrahedra, spheres or cuboids. The deformation description also comprises information such as rules from a physics engine about how objects behave when they shatter.

Figure 4:
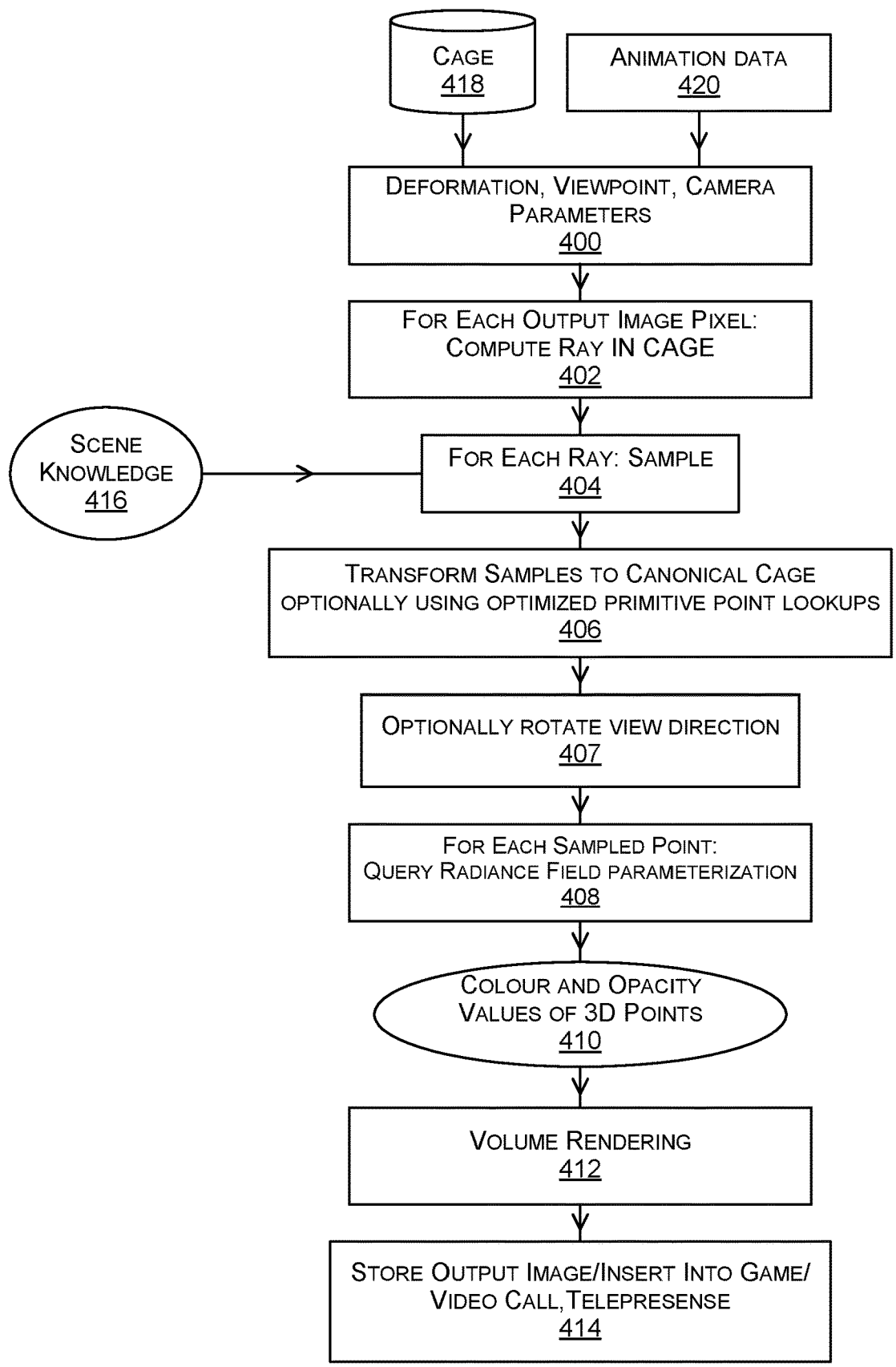
FIG. 4 is a flow diagram of an example method performed by the image animator of FIG. 1.

FIG. 4 is a flow diagram of an example method performed by the image animator of FIG. 1. Inputs 400 to the method comprise a deformation description, camera viewpoint and camera parameters. The camera viewpoint is a viewpoint of a virtual camera for which a synthetic image is to be generated. The camera parameters are lens and sensor parameters such as image resolution, field of view, focal length. The type and format of the deformation description depends on the type and format of the deformation description used in the training data when the radiance field parameterization was trained. The training process is described later with respect to FIG. 7. FIG. 4 is concerned with test time operation after the radiance field parameterization has been learnt. In some cases the deformation description is a vector of concatenated parameter values of a parameterized 3D model of an object in the dynamic scene such as a Vol3DMM model. In some cases the deformation description is one or more physics based rules from a physics engine to be applied to a cage of primitive 3D elements encapsulating the 3D object to be depicted and extending into a volume around the 3D object.

In some examples the inputs 400 comprise default values for some or all of the deformation description, the viewpoint, the intrinsic camera parameters. In some cases the inputs 400 are from a user or from a game apparatus or other automated process. In an example, the inputs 400 are made according to game state from a computer game or according to state received from a mixed-reality computing device. In an example an face or body tracker 420 provides values of the deformation description. The face or body tracker is a trained machine learning model which takes as input captured sensor data depicting at least part of a person's face or body and predicts values of parameters of a 3D face model or 3D body model of the person. The parameters are shape parameters, pose parameters or other parameters.

The deformation description comprises a cage 418 of primitive 3D elements. The cage of primitive 3D elements represents the 3D object to be depicted in the image and a volume extending from the 3D object. In some cases, such as where the 3D object is a person's head or body, the cage comprises a volumetric mesh with a plurality of volumetric blendshapes and a skeleton. In some cases where the 3D object is a chair, or other 3D object, the cage is computed from the learnt radiance field parameterization by computing a mesh from the density of the learnt radiance field volume using Marching Cubes and computing a tetrahedral embedding of the mesh. The cage 418 of primitive 3D elements is a deformed version of a canonical cage. That is, to produce a modified version of the scene the method begins by deforming a canonical cage to a desired shape which is the deformation description. The method is agnostic to the way in which the deformed cage is generated and what kind of an object is deformed.

The use of a cage to control and parametrize volume deformation enables deformation to be represented and applied to the scene in real-time, it is capable of representing both smooth and discontinuous function and allows for intuitive control by changing the geometry of the cage. This geometric control is compatible with machine learning models, physics engines, and artist generation software thereby allowing good extrapolation or generalization to configurations not observed in training.

In cases where the cage is formed from tetrahedra, using a collection of tetrahedra amounts to a piecewise-linear approximation of the motion field. Graphics processing unit (GPU)-accelerated raytracing allows the cage representation to be fast enough to query in milliseconds, even with highly complex geometry. The cage representation using tetrahedra is capable of reproducing hard object boundaries by construction and can be edited in off-the-shelf software due to being composed of only points and triangles.

At operation 402 the dynamic scene image generator computes a plurality of rays, each ray associated with a pixel of an output image 116 to be generated by the image animator. For a given pixel (x, y position in the output image) the image animator computes a ray that goes from the virtual camera through the pixel into the deformation description comprising the cage. To compute the ray the image animator uses geometry and the selected values of the intrinsic camera parameters as well as the camera viewpoint. The rays are computed in parallel where possible in order to give efficiencies since there is one ray to be computed per pixel.

For each ray the image animator samples a plurality of points along the ray. Generally speaking, the more points sampled the better quality the output image. A ray is selected at random and samples are drawn within specified bounds obtained from scene knowledge 416. In an example the specified bounds are computed from training data which has been used to train the machine learning system. The bounds indicate a size of the dynamic scene so that the one or more samples are taken from regions of the rays which are in the dynamic scene. To compute the bounds from the training data standard image processing techniques are used to examine training images. It is also possible for the bounds of the dynamic scene to be manually specified by an operator or for the bounds to be measured automatically using a depth camera, global positioning system (GPS) sensor or other position sensor.

Each sample is assigned an index of a 3D primitive element of the deformed cage that the sample falls within.

At operation 406 the image animator transforms the samples from the deformation description cage to a canonical cage. A canonical cage is a version of the cage representing the 3D object in a rest state or other specified origin state, such as where the parameter values are zero. In an example where the 3D object is a head of a person the canonical cage represents the head of the person looking straight at the virtual camera, with eyes open and mouth shut and a neutral expression.

Where the primitive 3D elements are tetrahedra the transform of the samples to the canonical cage is computed using barycentric coordinates as described below. Using barycentric coordinates is a particularly efficient way of computing the transform.

In an example where the cage uses tetrahedra, a point p in deformed space is mapped to P in canonical space using barycentric coordinates defined for both the canonical tetrahedron $X=\{X_1,X_2,X_3,X_4\}$ as well as the deformed tetrahedron $x=\{x_1,x_2,x_3,x_4\}$.

A tetrahedron, one fundamental building block, is a four-sided pyramid. Define the undeformed 'rest' position of its four constituent points as $$X=\{X_1, X_2, X_3, X_4\} \qquad (2)$$

and use lower-case to denote the deformed state $x=\{x_1, x_2, x_3, x_4\}$. Because tetrahedra are simplices, it is possible to represent points that fall inside them using barycentric coordinates ($\lambda 1, \lambda 2, \lambda 3, \lambda 4$) in reference to the set $X$ or $x$.

While an input point can be recovered as $p=\Sigma_{i=1}^{4}\lambda_i*x_i$ if $p$ falls inside that tetrahedron, obtain its rest position $P$ in the canonical space as $$P=\Sigma_{i=1}^{4}\lambda_i*X_i \qquad (3)$$

Where the primitive 3D elements are spheres or cuboids the transform of the samples to the canonical cage is computed using affine transformations instead, which are expressive enough for large rigidly moving sections of the motion field.

From each camera, shoot rays into the physical space, detect the tetrahedra x0 incident to each sample p along the ray and compute its barycentric coordinates such that $$p=\Sigma_{i=1}^{4}\lambda_i^1*x_i^0 \qquad (5)$$

In the case where the 3D elements are tetrahedra, an optimization is optionally used to compute the transform at operation 406 by optimizing primitive point lookups. The optimization comprises computing the transformation P of a sample by setting P equal to a normalized distance between a previous and a next intersection of a tetrahedron on a ray, times the sum, at the previous intersection, over four vertices of a tetrahedron of a barycentric coordinate of the vertex times a canonical coordinate of the vertex, plus one minus the normalized distance, times the sum, at the next intersection, over four vertices of the tetrahedron of the barycentric coordinate of a vertex time the canonical coordinate of the vertex. This optimization is found to give significant improvement in processing time such that real time operation of the process of FIG. 4 is possible at over 30 frames per second (i.e. to compute more than 30 images per second where the processor is a single RTX 3090 (trade mark) graphics processing unit).

Operation 407 is optional and comprises rotating a view direction of at least one of the rays. In this case, for one of the transformed samples, rotating a view direction of a ray of the sample is done prior to querying the learnt radiance field. Computing a rotation R of the view direction for a small fraction of the primitive 3D elements and propagating the value of R to remaining tetrahedra via nearest neighbor interpolation is found to give good results in practice.

For each sampled point the dynamic scene image generator queries 408 the radiance field parametrization 102. The radiance field parametrization has already been trained to produce color and density values, given a point in the canonical 3D cage and an associated viewing direction. In response to each query the radiance field parameterization produces a pair of values comprising a color and an opacity at the sampled point in the canonical cage. In this way the method computes a plurality of color and opacity values 410 of 3D points and view directions in the canonical cage with the deformation description applied.

In an example, the learnt radiance field parametrization 102 is a cache of associations between 3D points and view directions in the canonical version of the cage and color and opacity values, obtained by querying a machine learning model trained using training data comprising images of the dynamic scene from a plurality of viewpoints. By using a cache of values rather than querying a machine learning model directly, significant speed ups are achieved.

The radiance field is a function v which is queried to obtain the colour c as well as density σ at that position in space. Commonly, the color of a pixel on the image plane, $\hat{c}$, is obtained via volume rendering using an emission-absorption form of the volume rendering equation:

$$\hat{c}=\Sigma_{i=1}^{N}w_i c_i, \quad w_i=T_i(1-\exp(-\sigma_i\delta_i)), \qquad (1)$$

where $\delta i=(pi+1-pi)$ denotes the distance between samples (in total N) along straight rays, and the transmittance, Ti, is defined as $T_i=\exp(-\Sigma_{j=1}^{i-1}\sigma_j)$. v is usually modelled by a Multi-Layer Perceptron (MLP), an explicit voxel grid, or a combination of both. In addition to sample position p, v is also conditioned on the direction of the ray v, which allows it to model view-dependent effects such as specular reflections.

For each ray, a volume rendering 412 method is applied to the color and opacity values computed along that ray, to produce a pixel value of the output image. Any well-known computer graphics method for volume ray tracing is used. Where real time operation is desired hardware-accelerated volume rendering is used.

The output image is stored 414 or inserted into a virtual webcam stream or used for telepresence, a game or other applications.

Figure 5:
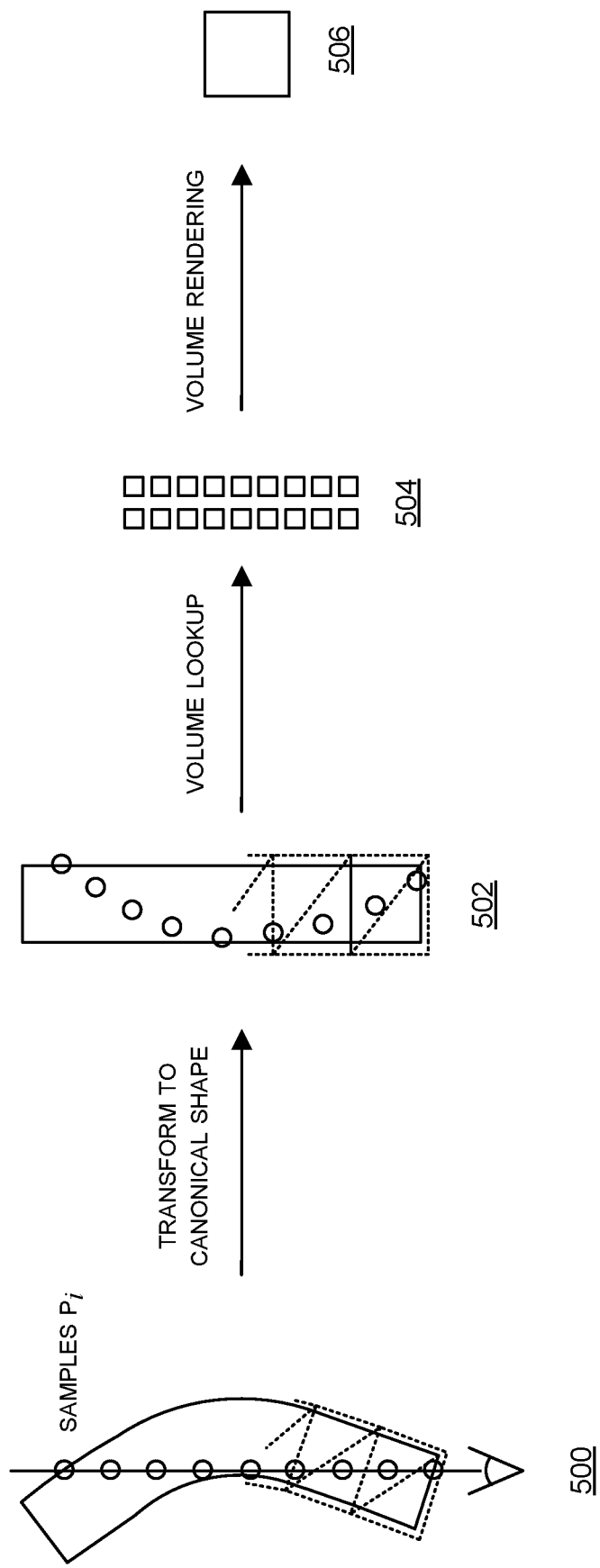
FIG. 5 is a schematic diagram of a ray in a deformed cage, the ray transformed to a canonical cage, a volume lookup and volume rendering.

FIG. 5 is a schematic diagram of a ray in a deformed cage 500, the ray transformed to a canonical cage 502, a volume lookup 504 and volume rendering 506. To render a single pixel a ray is cast from the camera center, through the pixel into the scene in its deformed state. A number of samples are generated along the ray and then each sample is mapped to the canonical space using the deformation $M_j$ of the corresponding tetrahedron j. The volumetric representation of the scene is then queried with the transformed sample position $p'_j$ and the direction of the ray rotated based on the rotation of the j-th tetrahedron. The resulting per-sample opacity and color values are then integrated using volume rendering as in equation one.

The density and color at each point in the scene is a function of both sample position and view direction. If sample positions are moved, but view directions stay unchanged, the light reflected off the elements of the scene will appear the same for every deformation. To alleviate this problem rotate the view direction of each sample with a rotation between the canonical tetrahedron and its deformed equivalent:

$$v'=Rv,$$

$$U, E, V=SVD((X-cX)^T(X'-c'X)),$$

$$R=UV^T,$$

where cX, c'X are the centroids of the canonical and deformed states of the tetrahedron that a given sample falls into. With this approach, the direction from which the light is reflected at each point of the scene will match the deformation induced by the tetrahedral mesh. Note however, that the reflected light will represent the scene in its canonical pose.

In practice, computing R for each sample or even each tetrahedron in the scene is inefficient as it requires computing Singular Value Decomposition (SVD). Instead take a stochastic approach where compute R for a small fraction ρ of tetrahedra and propagate R to the remaining tetrahedra via nearest neighbour interpolation. In the experiments described herein ρ=0.05.

More detail about an example of the primitive point lookups is now given.

With complex meshes, checking each tetrahedron for association with each input point is difficult given the complexity of point-in-tetrahedron tests. For non self-intersecting tetrahedral meshes the notions of a point being 'in front' or 'behind' a certain triangle are uniquely determined by the triangle vertices' winding order. Determining which tetrahedron a point belongs to amounts to shooting a ray in a random direction from the point, evaluating the triangle at first intersection and checking which side of the triangle the sample is on. This identifies the tetrahedron uniquely as each triangle can belong to at most two tetrahedra. Especially when hardware acceleration is available, these queries are highly efficient in terms of memory and compute.

In an example, apply the same acceleration to arbitrarily triangulated shapes to combine tetrahedra with triangulated rigidly-moving shapes that do not need to be filled with tetrahedra but can be treated as a unit in terms of deformation. Second, reduce the number of point-in-tetrahedron tests required by noting that many samples along a single ray can fall into the same element. Knowing the previous and next inter-section, a simple depth-test determines which tetrahedron samples fall into. Barycentric coordinates are linear, and so obtain a barycentrically interpolated value by interpolating values at the previous and next intersection within each element. To do this, rewrite Equation (3) as:

$$p = \alpha * \Sigma_{i=1}^{4} \lambda_i^1 * \chi_i^1 + (1.0 - \alpha) * \Sigma_{i=1}^{4} \lambda_i^2 * \chi_i^2 \qquad (4)$$

where the superscripts 1 and 2 refer to the previous and next intersection, and α is the normalized distance between the two intersections which defines the point the method is interpolating for.

Thanks to this modification, per point values remain stable even if the 'wrong' side of a triangle (or incorrect triangle all together) is queried due to a lack of numerical precision. One important side effect of this per-ray as opposed to per-point formulation of tetrahedral index lookups is that it naturally integrates with ray marching approaches to rendering. In the latter, rays are terminated based on transmittance, which the reformulated tetrahedral lookup algorithm naturally allows.

Figure 6:
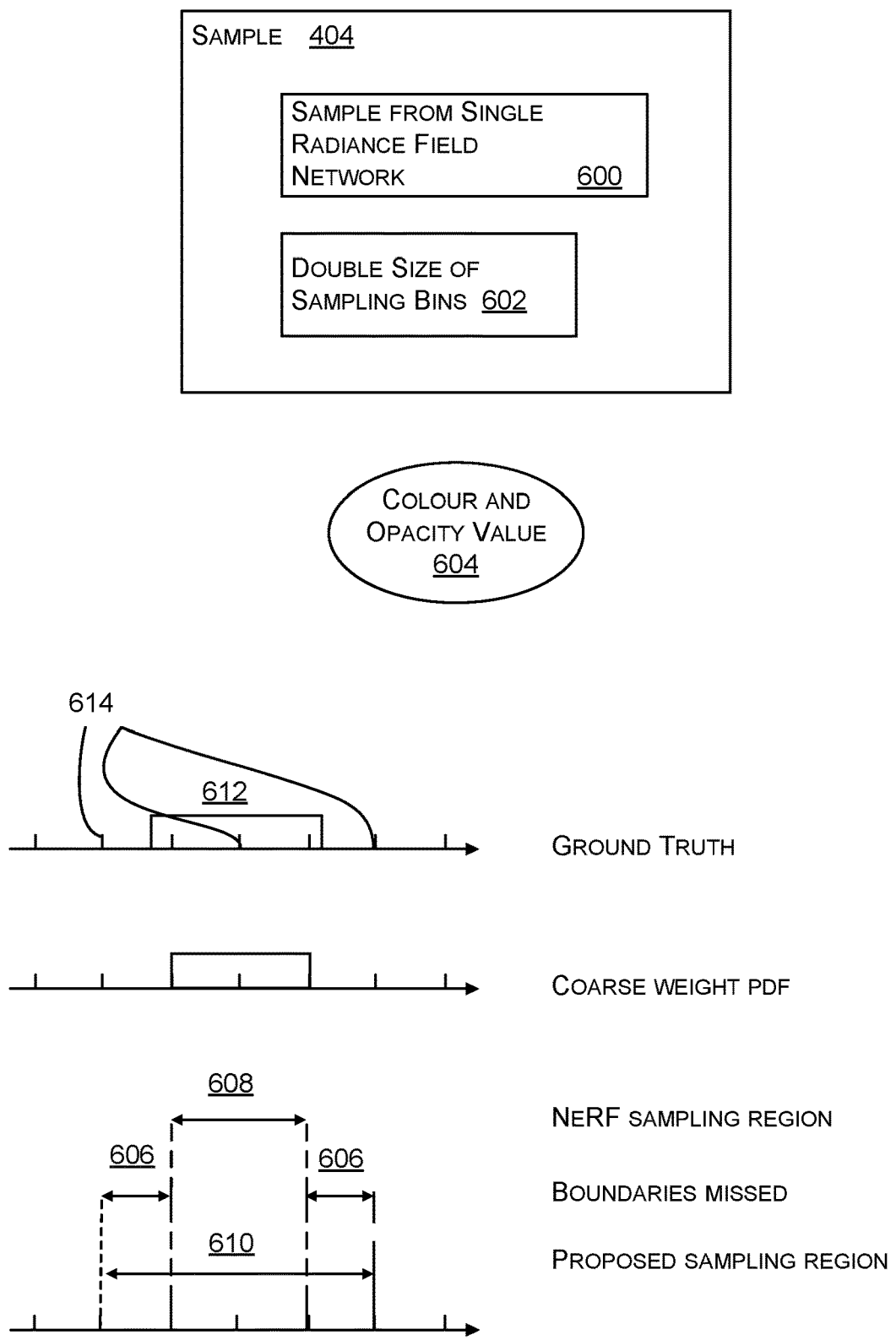
FIG. 6 is a flow diagram of a method of sampling.

FIG. 6 is a flow diagram of a method of sampling. The method comprises querying the learnt radiance field of the 3D scene to obtain a color value and an opacity value 604, using only one radiance field network 600 and increasing a size 602 of sampling bins.

Volumetric rendering typically involves sampling the depth along each ray. In examples there is a sampling strategy which enables capturing thin structures and fine details as well as improving sampling bounds. The method gives improved quality at a fixed sampled count.

Some approaches represent the scene with two Multi-Layer Perceptrons (MLPs): a 'coarse' and a 'fine' one. First, Nc samples are evaluated by the coarse network to obtain a coarse estimate of the opacities along the ray. These estimate then guides a second round of Nf samples, placed around the locations where opacity values are the largest. The fine network is then queried at both coarse and fine sample locations, leading to Nc evaluations in the coarse network and Nc+Nf evaluations in the fine network. During training, both MLPs are optimized independently, but only the samples from the fine one contribute to the final pixel color. The inventors have recognized that the first Nc samples evaluated in the coarse MLP are not used in rendering the output image, therefore being effectively wasted.

To improve efficiency, avoid querying the fine network at the locations of coarse samples and instead reusing the output from the first round of coarse samples with a single MLP network.

The simple change of using one network instead of two results in artefacts appearing, where areas around segments of a ray that have been assigned high weights can be clipped as illustrated in FIG. 6, 606, 608. Clipping can occur because the bin placement for drawing the fine samples treats density like a step function at the sample location instead of a point estimate of a smooth function. Therefore double the size of each importance sampling bin 610, allowing importance samples to cover the whole range between the coarse samples as illustrated in FIG. 6, 612, 614.

Figure 7:
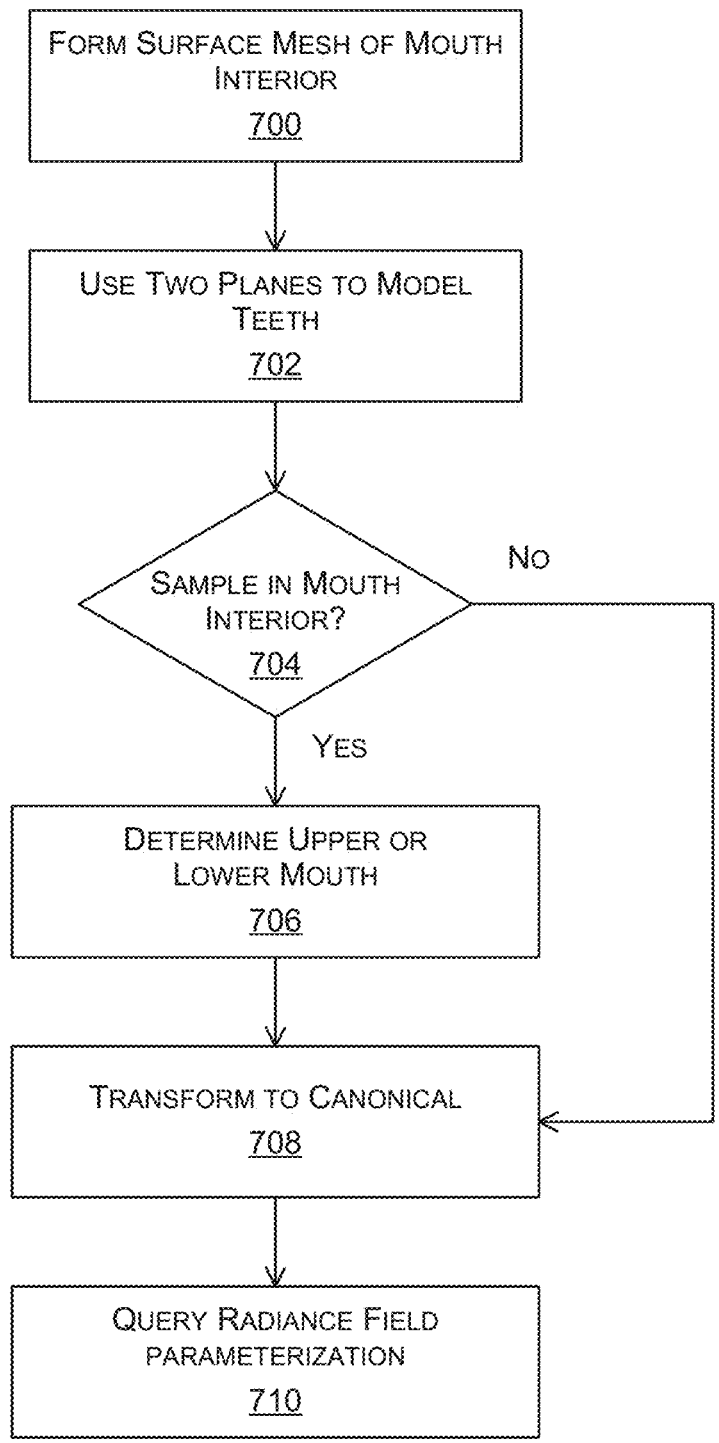
FIG. 7 is a flow diagram of a method of computing an image of a person depicting their mouth open.

FIG. 7 is a flow diagram of a method of computing an image of a person depicting their mouth open. The method of FIG. 7 is optionally used where only one or two time instances are used in the training images. If many time instances are available in the training images the process of FIG. 7 is not needed. In the method the cage represents a person's face and comprises a mesh of a mouth interior 700, a first plane to represent an upper set of teeth of the person and a second plane 702 to represent a lower set of teeth of the person. The method comprises checking 704 whether one of the samples falls in an interior of the mouth. If the checking 704 determines that one of the samples falls in an interior of the mouth, determining upper or lower mouth 706 and computing the transform 708 of the sample using information about the first and second planes. The transformed sample is used to query 710 the radiance field and the method proceeds as in FIG. 4.

In an example, define a separate deformation model for the mouth interior, bounded by closed triangular primitives, and animated by two rigidly moving planes, one for each set of teeth.

Operate in minimal-data training regime and use a single frame to train the models. Animation is then driven by an 'a priori' known animation model, Vol3DMM in the case of animating faces. Therefore, the cage geometry model is such that the primitives are non-self-intersecting (to allow for real time rendering) and are driven with Vol3DMM. In the special case of a mouth interior, a cavity fully filled with tetrahedra is not an appropriate choice, because the rendered teeth would deform as the mouth opens. This would result in unrealistic appearance and motion. An alternative of placing rigidly-deforming tetrahedra around the teeth would require a very high precision of geometry estimation.

Instead, select a different primitive for the mouth interior. First, fill the mouth interior with tetrahedra as if it was treated identically to the rest of the head and second, recording the indices of the outer triangles of the tetrahedra corresponding to the mouth interior, effectively forming a surface mesh for the mouth interior. This surface mesh moves together with the rest of the head, and is used to determine which samples fall inside the mouth interior, but is not used to deform them back to the canonical space. A GPU-accelerated raytracing supports both tetrahedra and triangle-bounded primitives, allowing to change the primitive that is driving the animation.

To model deformations, use two planes, one placed just below the top teeth and one just above the bottom teeth. Both of these planes move rigidly (i.e., they both remain planar), together with an underlying Volumetric 3D Morphable Model of the face. Assume that the teeth move rigidly with these planes and decide not to support the tongue, therefore assume that the space between the planes is empty.

With the surface mesh bounding the entirety of the mouth cavity and these two planes, animate the mouth interior with the following steps.

(1) Detect the primitive in which each sample falls and check if it is the mouth interior primitive.
(2) For each sample within the mouth interior primitive determine if it is the upper or lower mouth it falls in, using the signed distance to the upper and lower planes.
(3) Deform back to canonical by 1) computing the coordinates of the samples relative to the relevant plane, 2) finding the location of the plane in the canonical space and 3) assuming the relative coordinates of the sample to the relevant plane remain unchanged, computing the coordinates of the samples in the canonical space.

In an example a canonical pose is one with the mouth closed, i.e., with the teeth overlapping (top of bottom teeth is below the bottom of upper teeth). As a result, upper and lower mouth regions partially overlap in canonical space. Thus the color and density learnt in the canonical space have to be the average of the corresponding regions in the upper and lower mouth. To overcome this obstacle, place the canonical regions for the upper and lower mouth interior outside of the tetrahedral cage, to the left and to the right of it. This placement, alongside with the assumption of empty space between the two planes, results in a bijective mapping of samples from the mouth interior in the deformed space to the canonical space, allowing for correct learning of a Radiance Field for that region.

Figure 8:
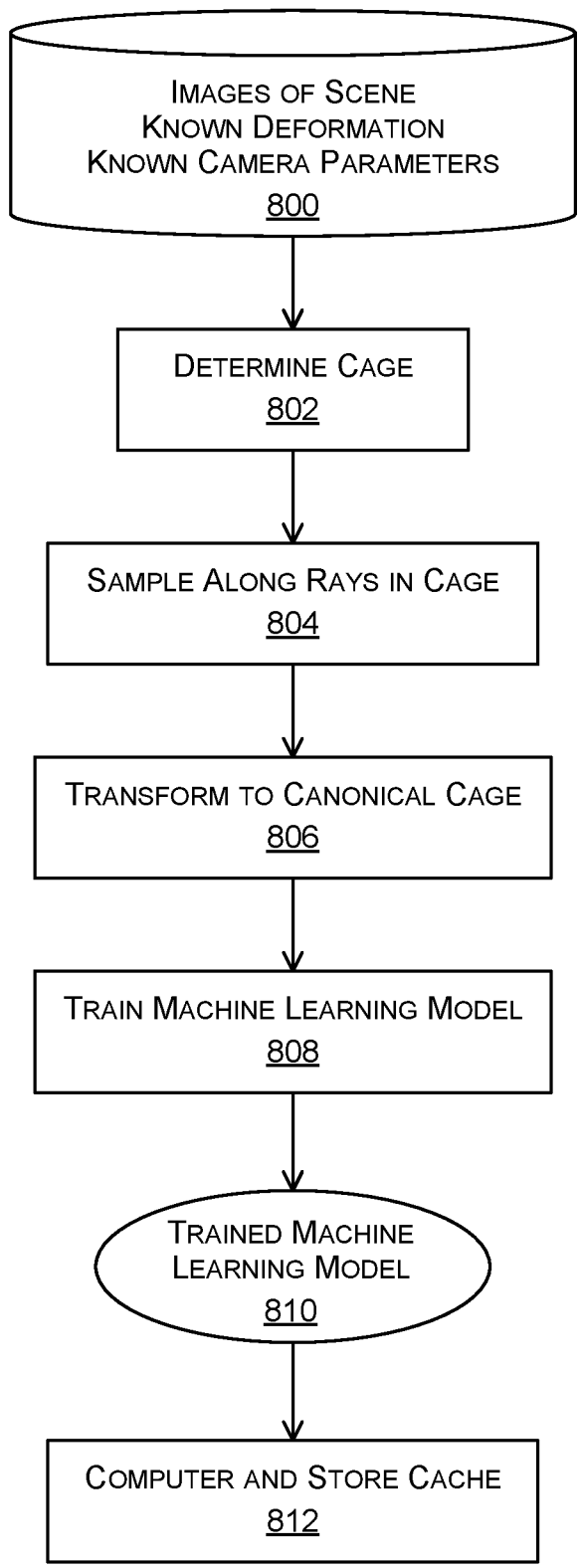
FIG. 8 is a flow diagram of a method of training a machine learning model and computing a cache.

FIG. 8 is a flow diagram of a method of training a machine learning model and computing a cache for use in an image animator 100. Training data 800 is accessed comprising images of a scene (either static or dynamic) taken from many viewpoints. Training is possible using sets of images of a static scene as training data. It is also possible using sequences where each image represents the scene in a different state.

FIG. 8 is first described for the case where the images are of the scene from a plurality of different viewpoints obtained at the same time instance or two time instants so that the amount of training data needed for enrollment is relatively low. By using a single time instant or two time instants accuracy is improved where a face tracker is used to compute the ground truth parameter values of the deformation description. This is because the face tracker introduces error and if it is used for frames at many time instances there is more error.

The training data images are real images such as photographs or video frames. It is also possible for the training data images to be synthetic images. From the training data images, tuples of values are extracted where each tuple is a deformation description, a camera viewpoint, camera intrinsic parameters and a color of a given pixel.

In the example of the chair from FIG. 3, the training data comprises images of the chair taken from many different known viewpoints at the same time instant. The images are synthetic images generated using computer graphics technology. From each training image a tuple of values is extracted where each tuple is a deformation description, a camera viewpoint, camera intrinsic parameters and a color of a given pixel. The deformation description is a cage which is determined 802 by using known image processing techniques to place a cage of primitive 3D elements around and extending from the chair. A user or an automated process such as a computer game, triggers a physics engine to deform the cage using physics rules, such as to shatter the chair when it falls under gravity, or to crush the chair when it experiences pressure from another object.

To form the training data, samples are taken along rays in the cage 804 by shooting rays from a viewpoint of a camera which captured the training image, into the cage. Samples are taken along the rays as described with reference to FIG. 4. Each sample is assigned an index of one of the 3D primitive elements of the cage according to the element the sample falls within. The samples are then transformed 806 to a canonical cage, which is a version of the cage in a rest position. The transformed samples are used to compute an output pixel color by using volume rendering. The output pixel color is compared with the ground truth output pixel color of the training image and the difference or error is assessed using a loss function. The loss function output is used to carry out backpropagation so as to train 808 the machine learning model and output a trained machine learning model 810. The training process is repeated for many samples until convergence is reached.

The resulting trained machine learning model 810 is used to compute and store a cache 812 of associations between 3D positions and view directions in the canonical cage and color and opacity values. This is done by querying the trained machine learning model 810 for ranges of 3D positions and storing the results in a cache.

In the example of the face from FIG. 2, the training data comprises images of the person's face taken from many different known viewpoints at the same time. Associated with each training data image are values of parameters of a Vol3DMM model of the person's face and head. The parameters include pose (position and orientation) of the eyes, and bones of the neck and jaw, as well as blendshape parameters which specify characteristics of human facial expressions such as eyes shut/open, mouth shut/open, smile/no smile and others. The images are real images of a person captured using one or more cameras with known viewpoints. A 3D model is fitted to each image using any well-known model fitting process whereby values of parameters of the 3DMM model used to generate Vol3DMM are searched to find a set of values which enable the 3D model to describe the observed real image. The values of the parameters which are found are then used to label the real image and are a value the deformation description. Each real image is also labelled with a known camera viewpoint of a camera used to capture the image.

The process of FIG. 8 operations 802 to 812 is then carried out.

The machine learning model is trained 808 with a training objective that seeks to minimize the difference between color produced by the machine learning model and color given in the ground truth training data.

In some examples involving face animation a sparsity loss is optionally applied in the volume surrounding the head and in the mouth interior.

Sparsity losses allow to deal with incorrect background reconstruction, as well as to mitigate issues arising from disocclusions in the mouth interior region. In an example, use a Cauchy loss:

$$\mathcal{L}_s = \frac{\lambda_s}{N} \sum_{i,k} \log\left(1 + 2\sigma(ri\ (tk))^2\right)$$

where i indexes rays ri shot from training cameras and k indexes samples tk along each of the rays. N is the number of samples to which the loss is applied, λs is a scalar loss weighting hyperparameter, and o is the opacity returned by the radiance field parameterization. To ensure the space is evenly covered by the sparsity loss, apply it to the 'coarse' samples. Other sparsity-inducing losses like weighted least-squares also work. Apply the sparsity loss in two regions: in the volume surrounding the head and in the mouth interior. Applied to the volume surrounding the head, the sparsity loss prevents opaque regions appearing in areas where there is not enough multi-view information to disentangle foreground from background in 3D. To detect these regions, apply the loss to (1) samples which fall in the tetrahedral primitives as this is the region rendered at test-time, and (2) samples which belong to rays which fall in the background in the training images as detected by 2D face segmentation network of the training images. Also apply the sparsity loss to the coarse samples that fall inside the mouth interior volume. This prevents the creation of opaque regions inside the mouth cavity in areas that are not seen at training, and therefore have no supervision, but become disoccluded at test time.

The sparsity loss inside the mouth interior ensures there is no unnecessary density inside the mouth interior. However, the color behind the regions which were occluded at training frame remains undefined, resulting in displeasing artefacts when these regions are disoccluded at test-time. A solution here is to override the color and density of the last sample along each ray that falls in the mouth interior, which allows to set the color of disoccluded regions at test-time to match the color of the learnt color in the visible region between the teeth at training time.

The present technology has been tested empirically for a first application and a second application.

In a first experiment physics-based simulation is used to control the deformation of a static object (an aircraft propellor) undergoing complex topological changes and to render photo-realistic images of the process for every step of the simulation. This experiment shows the representation power of the deformation description and the ability to render images from physical deformations difficult to capture with a camera. A dataset of a propeller undergoing a continuous compression and rotation was synthesized. For both types of deformation, render 48 temporal frames for 100 cameras. For the present technology train only on the first frame, which can be considered the rest state, but supply a coarse tetrahedral mesh describing the motion of the sequence. In the first application, the mean peak signal to noise ratio of the present technology on interpolation of every other frame (unseen in training) was 27.72 as compared with 16.63 for an alternative approach without using a cage and using positional encoding on the time signal. The peak signal to noise ratio of the present technology on extrapolation over time (second half of the frames, unseen in training) was 29.87 for the present technology as compared with 12.78 for the alternative technology. The present technology in the first application computed images at around 6 ms a frame with resolution 512×512, as opposed to around 30 s for the alternative technology.

In a second experiment, photo-realistic animations of human head avatars are computed in real-time with a blendshape-based face tracker. The avatars are trained with 30 images of the subject taken from different viewpoints at the same instant. Thus, for each avatar the method has only seen a single face expression and pose. To animate the head avatars the control parameters of a parametric 3DMM face model are used that extend from a surface mesh to the volume around it. The resulting parametric volumetric face model is referred to as Vol3DMM. Building on the parametric face model allows to generalize to face expressions and poses unseen at training and to use face trackers built on top of it for real-time control. A key benefit of the method is that hair, accessories and other elements are captured by the cage. The proposed approach can be applied to full bodies.

In the second experiment multi-view face data is acquired with a camera rig that captures synchronized videos from 31 cameras at 30 frames per second. These cameras are located 0.75-1 m from the subject, with viewpoints spanning 270° around their head and focusing mostly on frontal views within ±60°. Illumination is not uniform. All the images are down-sampled to 512×512 pixels and color corrected to have consistent color features across cameras. Estimate camera poses and intrinsic parameters with a standard structure-from-motion pipeline.

For the second experiment, capture speech sequences with natural head motion for four subjects. Half the subjects additionally performed various facial expressions and head rotations. To train the models for each subject use the face tracking result from a face tracker and images from multiple cameras at a single time-instance (frame). The frame is chosen to satisfy the following criteria: 1) a significant area of the teeth is visible and the bottom of the upper teeth is above the top of the lower teeth to place a plane between them, 2) the subject looks forward and some of the eye white is visible on both sides of the iris, 3) the face fit for the frame is accurate, 4) the texture of the face is not too wrinkled (e.g. in the nasolabial fold) due to the mouth opening. When a single frame satisfying 1-4 is not available, use two frames: a frame where the user has a neutral expression looking forward that satisfies 2-4 to train everything but the mouth interior, and a frame with the mouth open and that satisfies 1 and 3 to train the mouth interior.

The present technology is found to give a better PSNR than a baseline technology by 00.1 dB and to offer a 10% improvement in learned perceptual image patch similarity (LPIPS). The baseline technology uses an explicit mesh and does not have a cage extending beyond the face.

Figure 9:
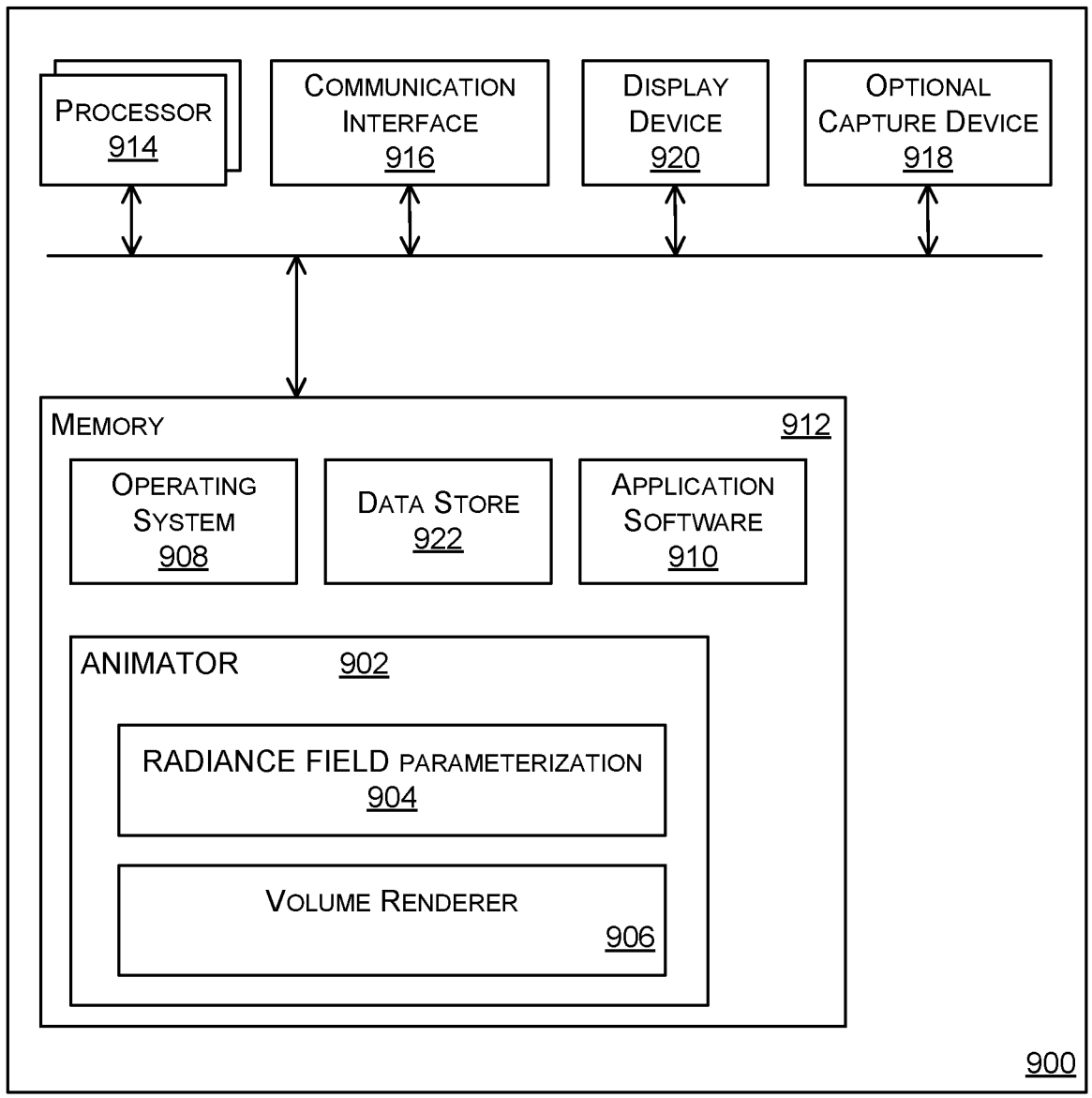
FIG. 9 illustrates an exemplary computing-based device in which embodiments of an animator for computing images of controllable dynamic scenes is implemented.

FIG. 9 illustrates various components of an exemplary computing-based device 900 which are implemented as any form of a computing and/or electronic device, and in which embodiments of an image animator are implemented in some examples.

Computing-based device 900 comprises one or more processors 914 which are microprocessors, controllers or any other suitable type of processors for processing computer executable instructions to control the operation of the device in order to generate synthetic images of a dynamic scene in a controllable manner. In some examples, for example where a system on a chip architecture is used, the processors 914 include one or more fixed function blocks (also referred to as accelerators) which implement a part of the method of any of FIGS. 4 to 8 in hardware (rather than software or firmware). Platform software comprising an operating system 908 or any other suitable platform software is provided at the computing-based device to enable application software 910 to be executed on the device. A data store 922 holds output images, values of face tracker parameters, values of physics engine rules, intrinsic camera parameter values, viewpoints and other data. An animator 902 comprising a radiance field parameterization 904 and a volume renderer 906 is present at the computing-based device 900.

The computer executable instructions are provided using any computer-readable media that is accessible by computing based device 900. Computer-readable media includes, for example, computer storage media such as memory 912 and communications media. Computer storage media, such as memory 912, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 912) is shown within the computing-based device 900 it will be appreciated that the storage is, in some examples, distributed or located remotely and accessed via a network or other communication link (e.g. using communication interface 916).

The computing-based device 900 has an optional capture device 918 to enable the device to capture sensor data such as images and videos. The computing-based device 900 has an optional display device 920 to display output images and/or values of parameters.

Alternatively or in addition to the other examples described herein, examples include any combination of the following clauses:

Clause A. A computer-implemented method of computing an image of a dynamic 3D scene comprising a 3D object, the method comprising:
  receive a description of a deformation of the 3D object, the description comprising a cage of primitive 3D elements and associated animation data from a physics engine or an articulated object model;
  for a pixel of the image, computing a ray from a virtual camera through the pixel into the cage animated according to the animation data and computing a plurality of samples on the ray, each sample being a 3D position and view direction in one of the 3D elements;
  compute a transformation of the samples into a canonical version of the cage to produce transformed samples;
  for each transformed sample, query a learnt radiance field parameterization of the 3D scene to obtain a color value and an opacity value;
  apply a volume rendering method to the color and opacity values to produce a pixel value of the image.

Clause B. The method of clause A wherein the cage of primitive 3D elements represents the 3D object and a volume extending from the 3D object.

Clause C. The method of clause B wherein the cage comprises a volumetric mesh with a plurality of volumetric blendshapes and a skeleton.

Clause D. The method of clause B wherein the cage is computed from the learnt radiance field parameterization by computing a mesh from the density of the learnt radiance field parameterization using Marching Cubes and computing a tetrahedral embedding of the mesh.

Clause E. The method of any preceding clause further comprising computing the transformation P of a sample by setting P equal to a normalized distance between a previous and a next intersection of a tetrahedron on a ray, times the sum, at the previous intersection, over four vertices of a tetrahedron of a barycentric coordinate of the vertex times a canonical coordinate of the vertex, plus one minus the normalized distance, times the sum, at the next intersection, over four vertices of the tetrahedron of the barycentric coordinate of a vertex time the canonical coordinate of the vertex.

Clause F. The method of clause A further comprising, for one of the transformed samples, rotating a view direction of a ray of the sample prior to querying the learnt radiance field parameterization.

Clause G. The method of clause F comprising computing a rotation R of the view direction for a small fraction of the primitive 3D elements and propagating the value of R to remaining tetrahedra via nearest neighbor interpolation.

Clause H. The method of any preceding clause wherein the canonical version of the cage is the cage with specified parameter values of an articulated object model or specified parameters of a physics engine.

Clause I. The method of any preceding clause wherein the canonical version of the cage represents a face with a closed mouth.

Clause J. The method of any preceding clause wherein the learnt radiance field parameterization is a cache of associations between 3D points in the canonical version of the cage and color and opacity values, obtained by querying a machine learning model trained using training data comprising images of the dynamic scene from a plurality of viewpoints.

Clause K. The method of any preceding clause wherein the images of the dynamic scene from a plurality of viewpoints are obtained at the same time instance or two time instants.

Clause L. The method of clause K wherein the cage represents a person's face and comprises a mesh of a mouth interior, a first plane to represent an upper set of teeth of the person and a second plane to represent a lower set of teeth of the person.

Clause M. The method of clause L comprising checking whether one of the samples falls in an interior of the mouth and computing the transform of the sample using information about the first and second planes.

Clause N. The method of any preceding clause comprising, during the process of, for each transformed sample, querying the learnt radiance field parameterization of the 3D scene to obtain a color value and an opacity value, using only one radiance field network and increasing a number of sampling bins.

Clause O. An apparatus comprising: at least one processor; a memory storing instructions that, when executed by the at least one processor, perform a method for computing an image of a dynamic 3D scene comprising a 3D object, comprising:
  receiving a description of a deformation of the 3D object, the description comprising a cage of primitive 3D elements and associated animation data from a physics engine or an articulated object model;
  for a pixel of the image, computing a ray from a virtual camera through the pixel into the cage animated according to the animation data and computing a plurality of samples on the ray, each sample being a 3D position and view direction in one of the 3D elements;

computing a transformation of the samples into a canonical version of the cage to produce transformed samples;

for each transformed sample, querying a learnt radiance field parameterization of the 3D scene to obtain a color value and an opacity value;

applying a volume rendering method to the color and opacity values to produce a pixel value of the image.

Clause P. A computer-implemented method of computing an image of a dynamic 3D scene comprising a 3D object, the method comprising:

receive a description of a deformation of the 3D object;

for a pixel of the image, computing a ray from a virtual camera through the pixel into the description and computing a plurality of samples on the ray, each sample being a 3D position and view direction in one of the 3D elements;

compute a transformation of the samples into a canonical space to produce transformed samples;

for each transformed sample, query a cache of associations between 3D points in the canonical space and color and opacity values;

apply a volume rendering method to the color and opacity values to produce a pixel value of the image.

Clause Q. The method of clause P further comprising one or more of: storing the image, transmitting the image to a computer game application, transmitting the image to a telepresence application, inserting the image into a virtual webcam stream, transmitting the image to a head mounted display.

Clause R. The method of clause P or Q comprising using an object tracker to detect parameter values of a model of a 3D object depicted in a video and using the detected parameter values and the model to compute the description of the deformation of the 3D object.

Clause S. The method of any of clause P to R comprising using a physics engine to specify the description.

Clause T. The method of any of clause P to S wherein the 3D primitive elements are any of: tetrahedra, spheres, cuboids.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A computer-implemented method of computing an image of a dynamic 3D scene comprising a 3D object, the method comprising:

receive a description of a deformation of the 3D object, the description comprising a cage of primitive 3D elements and associated animation data from a physics engine or an articulated object model;

for a pixel of the image, computing a ray from a virtual camera through the pixel into the cage animated according to the animation data and computing a plurality of samples on the ray, each sample being a 3D position and view direction in one of the primitive 3D elements;

compute a transformation of the samples into a canonical version of the cage to produce transformed samples, the canonical version of the cage representing the 3D object in a rest state or an origin state;

for each transformed sample, query a learnt radiance field parameterization of the 3D scene to obtain a color value and an opacity value; and apply a volume rendering method to the color and opacity values to produce a pixel value of the image.

2. The method of claim 1 wherein the cage of primitive 3D elements represents the 3D object and a volume extending from the 3D object.

3. The method of claim 2 wherein the cage comprises a volumetric mesh with a plurality of volumetric blendshapes and a skeleton.

4. The method of claim 2 wherein the cage is computed from the learnt radiance field parameterization by computing a mesh from density of the learnt radiance field parameterization using Marching Cubes and computing a tetrahedral embedding of the mesh.

5. The method of claim 1 further comprising computing the transformation P of a sample by setting P equal to a normalized distance between a previous and a next intersection of a tetrahedron on a ray, times the sum, at the previous intersection, over four vertices of a tetrahedron of a barycentric coordinate of the vertex times a canonical coordinate of the vertex, plus one minus the normalized distance, times the sum, at the next intersection, over four vertices of the tetrahedron of the barycentric coordinate of a vertex time the canonical coordinate of the vertex.

6. The method of claim 1 further comprising, for one of the transformed samples, rotating a view direction of a ray of the sample prior to querying the learnt radiance field parameterization.

7. The method of claim 6 comprising computing a rotation R of the view direction for a small fraction of the primitive 3D elements and propagating the value of R to remaining tetrahedra via nearest neighbor interpolation.

8. The method of claim 1 wherein the canonical version of the cage is the cage with specified parameter values of an articulated object model or specified parameters of the physics engine.

9. The method of claim 1 wherein the canonical version of the cage represents a face with a closed mouth.

10. The method of claim 1 wherein the learnt radiance field parameterization is a cache of associations between 3D points in the canonical version of the cage and color and opacity values, obtained by querying a machine learning model trained using training data comprising images of the dynamic scene from a plurality of viewpoints.

11. The method of claim 1 wherein the images of the dynamic scene from a plurality of viewpoints are obtained at the same time instance or two time instants.

12. The method of claim 11 wherein the cage represents a person's face and comprises a mesh of a mouth interior, a first plane to represent an upper set of teeth of the person and a second plane to represent a lower set of teeth of the person.

13. The method of claim 12 comprising checking whether one of the samples falls in an interior of the mouth and computing the transform of the sample using information about the first and second planes.

14. The method of claim 1 comprising, during the process of, for each transformed sample, querying the learnt radiance field parameterization of the 3D scene to obtain the color value and the opacity value, using only one radiance field network and increasing a number of sampling bins.

15. An apparatus comprising: at least one processor; a memory storing instructions that, when executed by the at least one processor, perform a method for computing an image of a dynamic 3D scene comprising a 3D object, comprising:

receiving a description of a deformation of the 3D object, the description comprising a cage of 3D elements and associated animation data from a physics engine or an articulated object model;

for a pixel of the image, computing a ray from a virtual camera through the pixel into the cage animated according to the animation data and computing a plurality of samples on the ray, each sample being a 3D position and view direction in one of the 3D elements;

computing a transformation of the samples into a canonical version of the cage to produce transformed samples, the canonical version of the cage representing the 3D object in a rest state or an origin state;

for each transformed sample, querying a learnt radiance field parameterization of the 3D scene to obtain a color value and an opacity value; and applying a volume rendering method to the color and opacity values to produce a pixel value of the image.

16. A computer-implemented method of computing an image of a dynamic 3D scene comprising a 3D object, the method comprising:

receive a description of a deformation of the 3D object;

for a pixel of the image, computing a ray from a virtual camera through the pixel into the description and computing a plurality of samples on the ray, each sample being a 3D position and view direction in a 3D element;

compute a transformation of the samples into a canonical space to produce transformed samples, the canonical space representing the 3D object in a rest state or an origin state;

for each transformed sample, query a cache of associations between 3D points in the canonical space and obtain color and opacity values; and apply a volume rendering method to the color and opacity values to produce a pixel value of the image.

17. The method of claim 16 further comprising one or more of: storing the image, transmitting the image to a computer game application, transmitting the image to a telepresence application, inserting the image into a virtual webcam stream, transmitting the image to a head mounted display.

18. The method of claim 16 comprising using an object tracker to detect parameter values of a model of a 3D object depicted in a video and using the detected parameter values and the model to compute the description of the deformation of the 3D object.

19. The method of claim 16 comprising using a physics engine to specify the description.

20. The method of claim 16 wherein the 3D element is one of a:
tetrahedra, sphere, and cuboid.

* * * * *